United States Patent [19]
Sand et al.

[11] Patent Number: 6,148,322
[45] Date of Patent: *Nov. 14, 2000

[54] PROCESSING UNIT WITH AN IMPROVED ABILITY TO COORDINATE THE EXECUTION OF MULTIPLE TASKS WITH VARYING PRIORITIES

[75] Inventors: Manfred Sand; Georg Trummer, both of Amberg, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/341,813

[22] Filed: Nov. 18, 1994

[30] Foreign Application Priority Data

Nov. 26, 1993 [EP] European Pat. Off. ............. 93119187

[51] Int. Cl.[7] ..................................................... G06F 9/46
[52] U.S. Cl. ........................................... 709/103; 709/102
[58] Field of Search ............................ 395/650; 709/100, 709/101, 102, 103, 105, 106, 107, 108

[56] References Cited

U.S. PATENT DOCUMENTS

| | | | |
|---|---|---|---|
| 4,084,228 | 4/1978 | Dufond et al. .......................... | 364/200 |
| 4,145,735 | 3/1979 | Soga ....................................... | 364/200 |
| 4,414,624 | 11/1983 | Summer, Jr. et al. ................... | 364/200 |
| 4,488,258 | 12/1984 | Struger et al. .......................... | 364/900 |
| 4,779,194 | 10/1988 | Jennings et al. ........................ | 364/200 |
| 5,065,310 | 11/1991 | Stone ...................................... | 395/425 |
| 5,465,335 | 11/1995 | Anderson ................................ | 395/375 |
| 5,504,881 | 4/1996 | Sirurget ............................... | 395/183.14 |
| 5,528,513 | 6/1996 | Vaitzblit et al. ..................... | 364/514 A |

OTHER PUBLICATIONS

IBM Technical Disclosure Bulletin, vol. 19, No. 11, Apr. 1977, C.J. Duggan, Jr.: *Programmable Priority for Cycle Steal*.

Katcher et al, Engineering and Analysis of Fixed Priority Schedulers, IEEE Trans. on Soft. Engineering, Sep. 1993, V:19, I9 pp. 920–934.

Sprunt et al, Exploiting Unused Periodic Time for aPeriodic Service Using the Extended Priority Exchange Algorithm, 1988, pp. 251–258.

Chipalkatti et al, Scheduling Policies for Real–Time and Non–Real–Time Traffic in a Statistical Multiplexer, Infocom 89 pp. 774–783.

DEC/OSF/I, Digital Equipment Corporation, 1993–1994, pp. 1–262, 1–275.

Teraoka et al, Virtual Network: Towards Location Transparent Communication in Large Distributed Systems, Sony, Jun. 13, 1990.

Khanna et al, Real–Time Scheduling in Sonos 5.0, Usenix, 92.

DEC OSF/I Vax System V to Dec. OSf/I Migration Guide Mar. 1993 pp. 1–1.4.

Sunos Version 5.5.1 Reference Manual, Priocntl(2) Command, 14 pages, 1990.

*Primary Examiner*—Majid A. Banankhah
*Attorney, Agent, or Firm*—Kenyon & Kenyon

[57] ABSTRACT

The present invention provides a processing unit with an improved ability to coordinate the execution of multiple tasks with varying priorities. Tasks to be executed are assigned both a request condition and a terminating condition, with the processing unit initiating execution of the task with the highest priority whose request condition is satisfied. In general, the processing unit terminates an executing task once the terminating condition of that task is satisfied, and then initiates execution of the next highest-priority task with a satisfied request condition. However, the processing unit may abort execution of a task (other than the highest-priority task) if the request condition of a higher-priority task becomes satisfied. Moreover, the processing unit ensures the highest-priority task does not monopolize system resources by tracking the elapsed execution time and terminating the highest-priority task if this elapsed time exceeds a predetermined maximum, in which case the processing unit initiates execution of the next highest priority task with a satisfied request condition.

18 Claims, 2 Drawing Sheets

PROCESSING UNIT WITH AN IMPROVED ABILITY TO COORDINATE THE EXECUTION OF MULTIPLE TASKS WITH VARYING PRIORITIES

BACKGROUND OF THE INVENTION

The present invention relates to processing units for computer systems, and in particular to a processing unit capable of coordinating the execution of multiple tasks having varying degrees of priority. Such processing units typically include a high-priority task, a low-priority task that is always executable, and numerous additional tasks having priorities at varying levels between the high-priority and low-priority tasks. Each of these tasks is executable by the processing unit, but only one task may be executed at any given point in time. Accordingly, the processing unit must coordinate the execution of these tasks to ensure all such tasks are executed in timely fashion.

To this end, each task executable by the processing unit is assigned a request condition and a terminating condition. The processing unit identifies a set of all tasks for which the request condition is satisfied and the terminating condition is not satisfied, and then initiates execution of the task in that set having the highest priority. Execution continues until the termination condition for the executing task is satisfied, at which time the processing unit initiates execution of the task in the set having the next highest priority.

Processing units of the type to which the present invention is directed are well known in the art, often being used as central processing units for modular programmable controllers. In such central processing units, execution of the highest-priority task continues until either its terminating condition is satisfied or the processing unit detects the satisfaction of the request condition for a task having a higher priority, at which time execution of the first task is superseded by the higher priority task. This type of task control is undesirable because the resources of the processing unit can be monopolized by the highest priority task, to the exclusion of all tasks having lower priorities.

Another known approach to multi-tasking in a processing unit involves assigning "time slices" to each task for which the request condition is satisfied, so that each task is executed periodically during its allocated time slice. In such systems, the only way to effect the priority of tasks is by assigning more time slices to a high-priority task than to a low-priority task. However, this approach has the drawback of not being able to immediately respond to requests for high-priority tasks.

One such "time slicing" processing unit is described in the "IBM Technical Bulletin," Vol. 19, No. 11, April 1977, at 4354–56. In that processing unit, each task is assigned a priority and typically the task having the highest priority is executed. However, a compulsory switch to another task is made after a predefined maximum time period elapses. This maximum time period is identical for all tasks.

A similar processing unit is described in U.S. Pat. No. 4,145,735, with the additional feature that the predefined maximum time period is "customized" to each task according to the task's priority. The highest-priority task is assigned the smallest maximum time period, while the lowest-priority task is assigned the largest maximum time period. In addition, a task can no longer be invoked once its maximum time period has elapsed.

Even systems using the time-slicing approach can become "locked-up" due to a system error. Thus, an object of the present invention is to provide a processing unit offering improved coordination over multiple executable tasks having varying levels of priority, while avoiding the types of "lock-ups" to which known systems are prone. This object is achieved by providing a processing unit which reacts quickly to high-priority tasks, yet ensures the high-priority tasks do not monopolize the resources of the processing unit.

SUMMARY OF THE INVENTION

The present invention provides a processing unit offering improved multi-tasking capability, effectively combining features of previously known priority-based and time-slicing approaches and offering additional features to improve performance. In one embodiment of the present invention, a processing unit will abort a currently-executing task upon satisfaction of the request condition for a task having a higher priority, and will then initiate execution of the higher priority task. Processing of the higher-priority task continues until a predetermined maximum processing time elapses, at which time the task is aborted in favor of a task having a next highest priority for which the request condition is satisfied and the terminating condition is not satisfied. However, the highest-priority task can only be aborted based on the maximum time processing elapsing, and cannot be superseded by another highest-priority task (that is, another task also having the highest priority). In a variation of this embodiment, the maximum processing time may be set by the user to accommodate the particular requirements of a given system.

As in any complex electronic device, systems of this type can become "locked-up" due to an error. According to the present invention, this type of failure, typically due to an internal error in the processing unit, can generally be detected and often even corrected externally. This detection/correction ability is possible if a high-priority task is able to exchange communications instructions with external units connected to the processing unit by a bus, thereby ensuring the processing unit remains accessible externally even if it becomes "locked-up" internally. To ensure tasks received by the "locked-up" processing unit are processed, at least one high-priority communications task is assigned the second-highest possible priority. This high-priority communications task can then evaluate instructions received from the high-priority task and at least partially process such instructions.

Moreover, the present invention permits the processing of communications instructions by the high-priority communications task to be advantageously limited to only high-priority communications instructions, while still ensuring all communications instructions are executed over the course of time. This goal is accomplished by defining a low-priority task consisting of a cyclically-repeating task and a low-priority communications task, with the low-priority communications task assigned the lowest possible priority and the cyclically-repeating task assigned the second lowest possible priority. Low-priority communications instructions received by the high-priority communications task are then transferred to the low-priority communications task for processing. During execution of the cyclically-repeating task, the processing unit aborts the task after a predetermined cycle processing time and initiates the low-priority communications task.

Features and advantages of the present invention are described below in the context of the preferred embodiments, with reference to the drawing figures. Other features and advantages will be readily apparent to persons skilled in the art.

DETAILED DESCRIPTION

Figure 1:
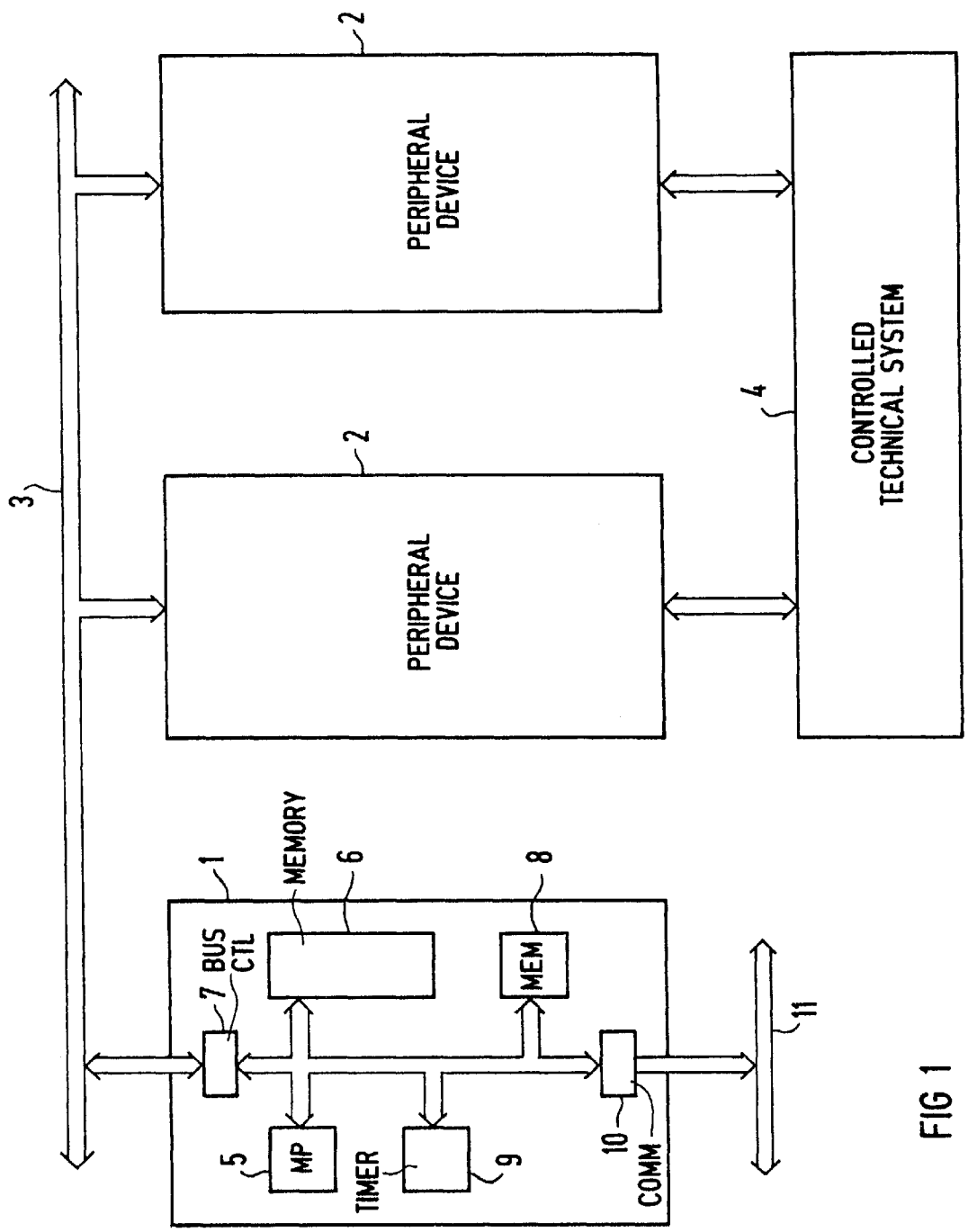
FIG. 1 is a block diagram showing an embodiment of a programmable controller according to the present invention.

Referring to FIG. 1, a processing unit, such as a modular programmable controller, includes a central processing unit 1 and peripheral units 2 which are coupled to one another by a device bus 3. Using the peripheral units 2, the central processing unit 1 can obtain status information from, and output setting commands to, a technical system 4. The details of the technical system 4 is not relevant to the present invention, and thus are not further described.

The central processing unit 1 of the programmable controller includes a microprocessor 5 which executes a user program (not shown) stored in a memory 6. The memory 6 may be a read-write memory, or RAM. Through execution of the user program, the microprocessor 5 may access the peripheral units 2 through a bus controller 7, thereby effecting control of the technical system 4.

In addition to the user program, the memory 6 also stores a so-called "process image" (that is, the input signals read in from the peripheral units 2 and the output signals to be sent to the peripheral units 2). The memory 6 may also serve as both a working memory and a temporary storage space. Finally, a second memory 8, preferably implemented as a read-only memory (for example, an EEPROM), stores an operating system of the microprocessor 5.

The central processing unit 1 also includes a timer module 9 and a communications interface 10. The timer module 9 provides information that enables the microprocessor 5 to determine, for example, the length of time that has elapsed since a given event, while the communications interface 10 enables the microprocessor 5 to access a network bus 11. The central processing unit 1 can thus communicate with external devices. Examples of such external devices might include a programming device for programming and/or monitoring the central processing unit 1, or even the central processing units of other programmable controllers.

According to the present invention, efficient processing by the central processing unit 1 is facilitated by dividing the individual jobs to be processed into a set of separate tasks, each of which can be executed by the central processing unit 1. Each task is then assigned a respective priority. Examples of these tasks for an embodiment of the present invention are illustrated in FIG. 2, with the lowest priority task at the bottom of the list and the highest priority task at the top.

Figure 2:
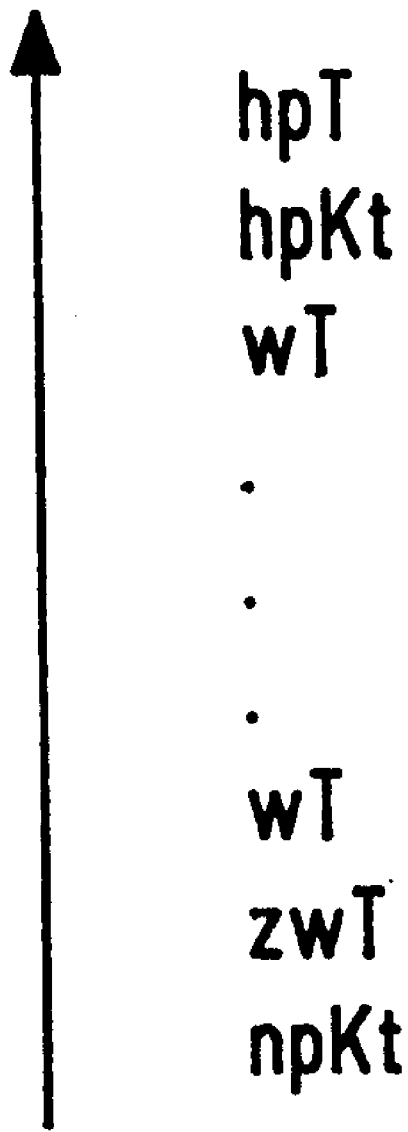
FIG. 2 illustrates the relative priorities of tasks executed by a programming unit configured according to the present invention.

As shown in FIG. 2, the highest priority task executable by the central processing unit 1 is denoted the high-priority task hpT. In the present embodiment, the high-priority task hpT transmits communications instructions to, and receives communications instructions from, the peripheral devices 2 connected to the central processing unit 1 across the network bus 11.

In the embodiment of FIG. 2, the task having the second-highest priority is the high-priority communications task hpKt. This task evaluates communications instructions received from the high-priority task hpT and determines whether the received communications instructions are high-priority or low-priority. If the received communications instructions are high-priority, the high-priority task hpT processes the instructions itself; otherwise, the high-priority task hpT transfers the instructions to a low-priority communications task npKt for processing. The low-priority communications task npKt is assigned the lowest priority of all of the tasks. Here, the high-priority communications task hpKt is implemented as an independent task, but it could also be designed as a submodule of the high-priority task hpT.

The second-lowest priority task is the so-called cyclically-repeated task zwT. This task will be continuously executed as long as no task having a higher priority is awaiting execution.

In addition to the tasks described above, the central processing unit 1 can also execute a number of additional tasks wT. The details of such tasks are not relevant to the present invention, and are not described in depth. Such tasks might include, for example, a timer refresh using the timer module 9, various time-triggered alarms, process alarms from the technical system 4 being controlled, and internal alarms for the central processing unit 1.

The microprocessor 5 of the central processing unit 1 is capable of executing only one task at any given instant. Thus, every task—except for the cyclically-repeated task zwT—is assigned a request condition and a terminating condition to assist in coordinating execution of the various tasks. For example, if a request condition for a task having a priority greater than that of the currently-executing task becomes satisfied, the central processing unit 1 will terminate the currently-executing task and initiate execution of the higher priority task. As a general rule, the execution of this newly-initiated task will not be terminated until either (a) the request condition for a task having an even higher priority is satisfied; or (b) the terminating condition of the task becomes satisfied. The central processing unit 1 thus executes tasks in an event-driven manner.

As explained above, the central processing unit 1 of the present embodiment controls an automation system. Thus, the central processing unit 1 must be capable of reacting very quickly to an altered process condition under certain circumstances. On the other hand, the communications instructions handled by the high-priority task hpT can often be of extended duration. A unique procedure, described below, is therefore provided to ensure the central processing unit 1 can satisfy both of these potentially conflicting requirements.

Whenever the central processing unit 1 initiates execution of the high-priority task hpT, the timer module 9 begins tracking an elapsed execution time. The central processing unit 1 will abort execution of the high-priority task hpT if this elapsed time exceeds a user-selected maximum processing time, regardless of whether the terminating condition of the high-priority task hpT has been satisfied. The central processing unit 1 would then initiate execution of the task having the next-highest priority for which the request condition is satisfied. In this way, the central processing unit 1 can react to altered process states despite the existence of extended communications instructions to be processed. The execution of the high-priority task hpT will not be resumed until a user-selected deactivation time elapses.

As noted above, the central processing unit 1 of this type of system can become "locked-up" due, for example, to a programming error in the control software. Once this happens, the central processing unit 1 is no longer capable of actively controlling the technical system 4. Under general programming rules, however, a failure in the central processing unit 1 should not create a critical state in the technical system 4. According to the present invention, it will not. Since the high-priority task hpT is assigned the highest priority of any task, it is possible to externally access the central processing unit 1 even when it is "locked-up." Accordingly, failures of the central processing unit 1 may often be corrected externally.

The central processing unit 1 is also designed to accommodate conflicting requirements relating to the lowest priority tasks. As noted above, the cyclically-repeated task zwT is assigned the second-lowest priority and the low-priority communications task npKt is assigned the lowest-priority. On the other hand, the cyclically-repeated task zwT is always executable. Thus, the low-priority communications task npKt would never be executed in a purely event-driven central processing unit 1. For this reason, execution of the cyclically-repeated task zwT is monitored in a manner analogous to the high-priority task hpT. That is, when the elapsed execution time exceeds a user-selected cycle processing time, the cyclically-repeated task zwT is aborted and execution of the low-priority communications task npKt is initiated.

According to the present invention, the central processing unit 1 can be operated as a two-state controller using the elapsed execution times $T_z$ and $T_k$, corresponding to the cyclically-repeated task zwT and the low-priority communications task npKt, respectively. To accomplish such two-state control, the elapsed execution times $T_z$ and $T_k$ can be measured and stored temporarily in the memory 6 for comparison. The cycle processing time can then be maintained at zero, for example, if the ratio of the elapsed times $T_z$ and $T_k$ exceeds a predetermined upper limit; and maintained at infinity or a fixed time if the ratio drops below a predetermined lower limit.

As an alternative to two-state control, it is also possible, for example, to assign the low-priority communications task npKt a "time slice" of some predetermined length. In such a case, the low-priority communications task npKt could always be invoked and executed following execution of each cycle of the cyclically-repeated task zwT.

Using the procedures described above, the present invention ensures the central processing unit 1 is event-driven under normal circumstances (that is, as long as the high-priority task hpT does not demand excessive processing time). In addition, the central processing unit 1 is capable of responding to the controlled technical system 4 within a predetermined maximum response time, even when higher-priority communications jobs of extended duration are awaiting processing.

The present invention has been described with reference to specific embodiments. However, persons skilled in the art will readily recognize that various modifications and enhancements are possible. Accordingly, the present invention is intended to encompass all such modifications and enhancements that fall within the scope and spirit of the appended claims.

What is claimed is:

1. A processing unit for controlling the serial execution of a plurality of tasks, each of which is associated with an execution priority such that said plurality of tasks comprises a high-priority task, a low priority task, and one or more additional tasks with respective priorities between said high-priority task and said low-priority task, said high-priority task and said one or more additional tasks each having associated therewith a respective request condition and termination condition, and said low-priority task being always executable, wherein said processing unit controls the execution of said plurality of tasks by:

terminating a currently-executing task upon a satisfaction of the terminating condition associated with said currently-executing task, and initiating a task having a next highest priority, a satisfied request condition, and an unsatisfied terminating condition;

aborting a currently-executing task, other than said high-priority task, upon detection of a satisfied request condition for a task having a higher priority than said currently-executing task, and initiating said higher priority task;

after said high-priority task fails to release said processing unit and without an external manual intervention, automatically aborting said high-priority task if an elapsed execution time for said high-priority task exceeds a predetermined maximum processing time, regardless of whether the terminating condition for said high-priority task has been satisfied, and initiating a task having a next highest priority, a satisfied request condition, and an unsatisfied terminating condition; and resuming execution of the aborted high-priority task after a deactivation time has elapsed.

2. The processing unit of claim 1, wherein said predetermined maximum processing time is selected by a user.

3. The processing unit of claim 1, wherein said high-priority task exchanges communications instructions with an external device.

4. The processing unit of claim 3, wherein said one or more additional tasks includes a high-priority communications task having associated therewith a second-highest priority, said high-priority communications task evaluating and at least partially processing communications instructions received from said high-priority task.

5. The processing unit of claim 4, wherein said low-priority task comprises a cyclically-repeated task and a low-priority communications task, said low-priority communications task having associated therewith a lowest priority and said cyclically-repeated task having associated therewith a second-lowest priority, said low-priority communications task processing communications instructions received from said high-priority communications task, and said processing unit aborts said cyclically-repeated task upon expiration of a maximum cycle processing time and initiates said low-priority communications task.

6. The processing unit of claim 5, wherein said maximum cycle processing time is dependent upon a comparison of respective prior execution times for said cyclically-repeated task and said low-priority communications task.

7. An automation system for a technical process, said automation system comprising a processing unit for controlling execution of a plurality of tasks with varying priorities, said plurality of tasks including a high-priority task, a low-priority task that is always executable, and one or more additional tasks having respective priorities between said high-priority task and said low-priority task, said high-priority task and said one or more additional tasks also having a respective request condition and terminating condition, said processing unit comprising:

means for terminating a currently-executing task upon satisfaction of the terminating condition for said currently-executing task, and initiating a task having a next highest priority, a satisfied request condition, and an unsatisfied terminating condition;

means for aborting a currently-executing task, other than said high-priority task, in favor of a task having a higher priority than said currently-executing task and a satisfied request condition;

means for aborting said high-priority task if an elapsed execution time for said high-priority task exceeds a maximum processing time, regardless of whether the terminating condition for said high-priority task has been satisfied, in favor of a task having a next highest priority, a satisfied request condition, and an unsatisfied terminating condition, said high-priority task being automatically aborted after said high-priority task fails to release said processing unit and without an external manual intervention; and means for resuming execution of the aborted high-priority task after a deactivation time has elapsed.

8. The automation system of claim 7, wherein said predetermined maximum processing time is user-selectable.

9. The automation system of claim 7, wherein said high-priority task receives communications instructions from and transmits communications instructions to one or more external devices.

10. The automation system of claim 9, wherein said one or more additional tasks includes a high-priority communications task having a second-highest priority, said high-priority communications task evaluating and at least partially processing communications instructions received from said high-priority task.

11. The automation system of claim 10, wherein said low-priority task comprises a cyclical task and a low-priority communications task, said low-priority communications task having a lowest priority and said cyclical task having a second-lowest priority, said low-priority communications task processing communications instructions received from said high-priority communications task, said processing unit aborting execution of said cyclical task after expiration of a maximum cycle processing time in favor of said low-priority communications task.

12. The automation system of claim 11, wherein said maximum cycle processing time is dynamically determined by comparing a prior execution time for said cyclical task and a prior execution time for said low-priority communications task.

13. A method for controlling the serial execution of a plurality of tasks in a processing unit, said method comprising:

assigning an execution priority to each of said plurality of tasks, such that said plurality of tasks comprises a high-priority task, a low-priority task, and one or more additional tasks with respective priorities between said high-priority task and said low-priority task;

assigning a respective request condition and terminating condition to said high-priority task and said one or more additional tasks;

identifying a set of said plurality of tasks having a satisfied request condition and an unsatisfied terminating condition, and initiating a member of said set of tasks having a highest priority;

terminating a currently-executing task upon satisfaction of its terminating condition, and initiating a task having a next highest priority, a satisfied request condition, and an unsatisfied terminating condition;

after said high-priority task fails to release said processing unit and without an external manual intervention, automatically aborting a currently-executing task, other than said high-priority task, upon identification of a task having a higher priority than said currently-executing task and a satisfied request condition, and initiating said higher priority task;

aborting said high-priority task if an elapsed execution time for said high-priority task exceeds a predetermined maximum processing time, regardless of whether the terminating condition for said high-priority task has been satisfied, and initiating a task having a next highest priority, a satisfied request condition, and an unsatisfied terminating condition; and resuming execution of the aborted high-priority task after a deactivation time has elapsed.

14. The method of claim 13, further comprising the step of accepting a user-input maximum processing time.

15. The method of claim 13, wherein a highest priority is assigned to a task responsible for exchanging communications instructions with one or more external devices.

16. The method of claim 15, wherein a second-highest priority is assigned to a task responsible for evaluating and at least partially processing communications instructions received from said task having said highest priority.

17. The method of claim 16, wherein a lowest priority is assigned to a cyclical task and a second-lowest priority is assigned to a task responsible for processing communications instructions received from said second highest-priority task, said method further comprising the step of aborting said cyclical task upon expiration of a maximum cycle processing time and initiating said second lowest-priority task.

18. The processing unit of claim 17, further comprising the step of determining said maximum cycle processing time from a prior execution time for said cyclical task and a prior execution time for said second lowest-priority task.

* * * * *